WILLIAM FRANKEL.
Improvement in Ratchet-Drills.
No. 114,545.          Patented May 9, 1871.
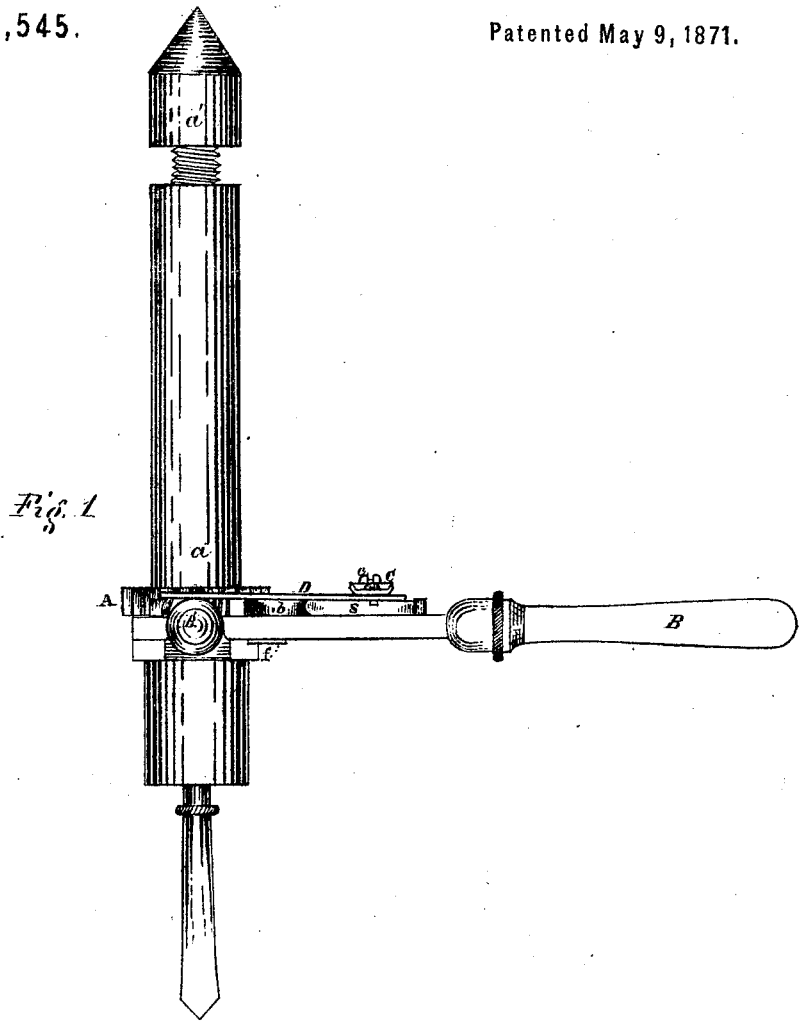
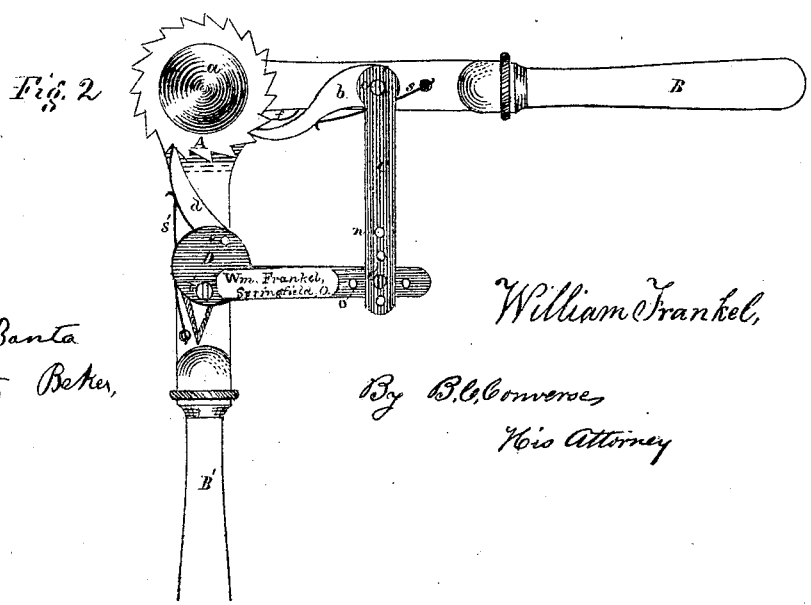
Witnesses.
John A. Banta
H. A. Baker
William Frankel,
By B. C. Converse
His Attorney

United States Patent Office.

WILLIAM FRANKEL, OF SPRINGFIELD, OHIO.

Letters Patent No. 114,545, dated May 9, 1871.

---

IMPROVEMENT IN RATCHET-DRILLS.

---

The Schedule referred to in these Letters Patent and making part of the same.

---

I, WILLIAM FRANKEL, of the city of Springfield, in the county of Clark and State of Ohio, have invented certain Improvements in Ratchet-Drills, of which the following is a specification.

My invention relates to that class of ratchet-drills used by hand for drilling in places where machinery cannot be applied, such as boilers, iron-building fronts, &c.

Two hand-levers are used instead of one, as in the ordinary hand-drill. They are attached by rings or collars on their ends to the drill-stock, so as to work freely on the same. The lower one, which rests on a shoulder turned on the stock or shaft, is bent at an angle where it joins the drill-stock, to bring its top surface on the same plane of the lever above it, and to facilitate the working of the pawls and springs which are attached on the levers and work the ratchet-wheel, which latter is fastened on the stock above the levers.

These hand-levers are connected by two smaller intermediate levers pivoted upon them at one end, and extending between them nearly at right angles with each other, their ends crossing and pivoted together. A series of holes in them is made for adjusting their movement.

The object of this arrangement of the two hand-levers and their accessories is to allow the drill to be used in small angular spaces, and particularly in reverse angles, where the same lever could not be operated in both places.

Figure 1 shows an elevation of my improvement.
Figure 2 is a plan of the same.

A is the ratchet-wheel, fastened on the stock or shaft $a$, with a head, $a'$, and feed-screw, as in ordinary drills.

B and B' are hand-levers, furnished with pawls $b$ and $d$ for operating the ratchet-wheel A.

C and D are small intermediate levers pivoted upon the hand-levers and working between them, their ends crossing nearly at right angles.

$c'$ is the pin which connects them at this point.

$n$ and $o$ are holes for adjustment.

A stop, $f$, on the under side of the hand-lever B, (where it joins the stock,) prevents B and B' from being brought too close together.

The part of lever D which is pivoted upon lever B' is of circular shape, and large enough to give the required distance from pin $i$ to $e$.

Pin $i$ (which pivots D to B') is placed near the edge of the circular part, while pin $e$, (which pivots pawl $d$ to D,) on the inner and opposite side, is also near the edge, so that pins $e$, $i$, and $c'$ form an angle sufficient to give the required movement to the pawl $d$.

The shape given to D is preferable to an angular lever, better protection being given to the pawl and to spring $s$, which is quite long.

By reference to fig. 2 it will be seen that in drilling holes in a corner or angular space, as in an iron front of a building where the architrave and column form an angle with the column projecting on the left, the lever B' will be held with the left hand in the position shown in this figure, and lever B used to work the drill by being pulled down toward B'; and in drilling in the opposite corner on the right B will be held perpendicularly beside the column on that side, and B' pulled down toward B, with the same result.

In many confined spaces in boiler-work this improvement can be used in the same manner, the space being often so limited that the drill with a single hand-lever can only be turned an eighth or tenth of a revolution at a time, and sometimes cannot be used at all.

I do not claim the ratchet mechanism as a new device for producing continuous motion; but

What I claim as new is—

The arrangement of levers B and B', in combination with stock $a$, intermediate levers C and D, pins $e$ $i$ $c'$, springs $s$ and $s'$, pawls $b$ and $d$, ratchet-wheel A, and stop $f$.

WILLIAM FRANKEL.

Witnesses:
B. C. CONVERSE,
J. K. MOWER.